Figure 1:
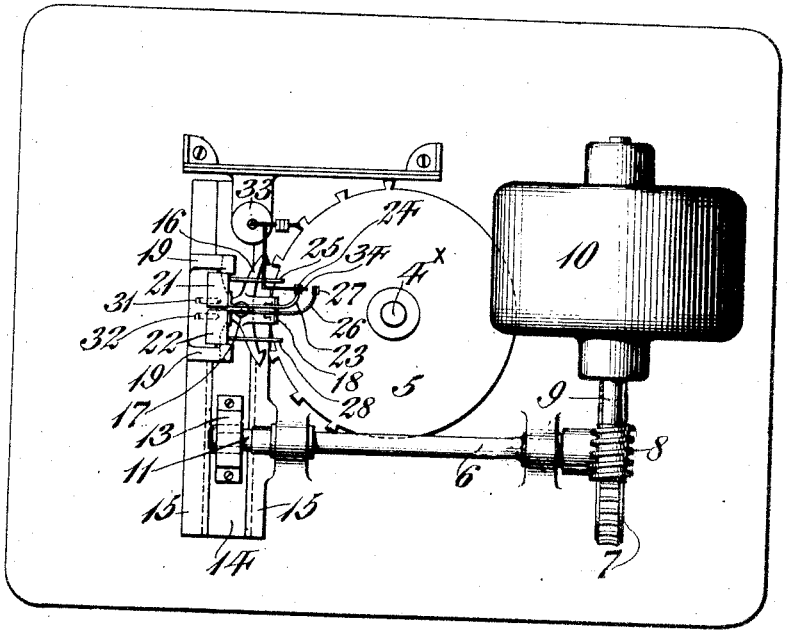
Figure 3:
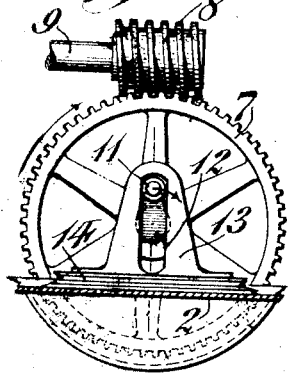
Figure 4:
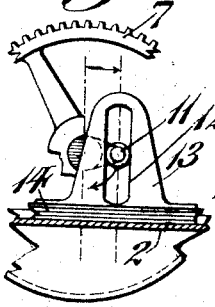
Figure 5:
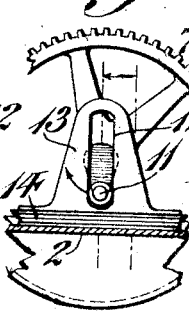
Figure 6:
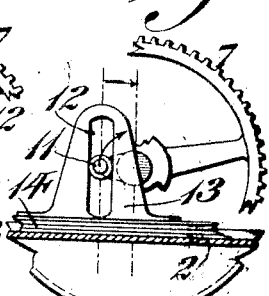

B. P. RUCKER.
AUTOMATIC FEEDER REGULATOR.
APPLICATION FILED APR. 1, 1910.

980,129.

Patented Dec. 27, 1910.
4 SHEETS—SHEET 1.

WITNESSES

INVENTOR
Benjamin Parks Rucker
BY Wiedersheim & Fairbanks
ATTORNEYS

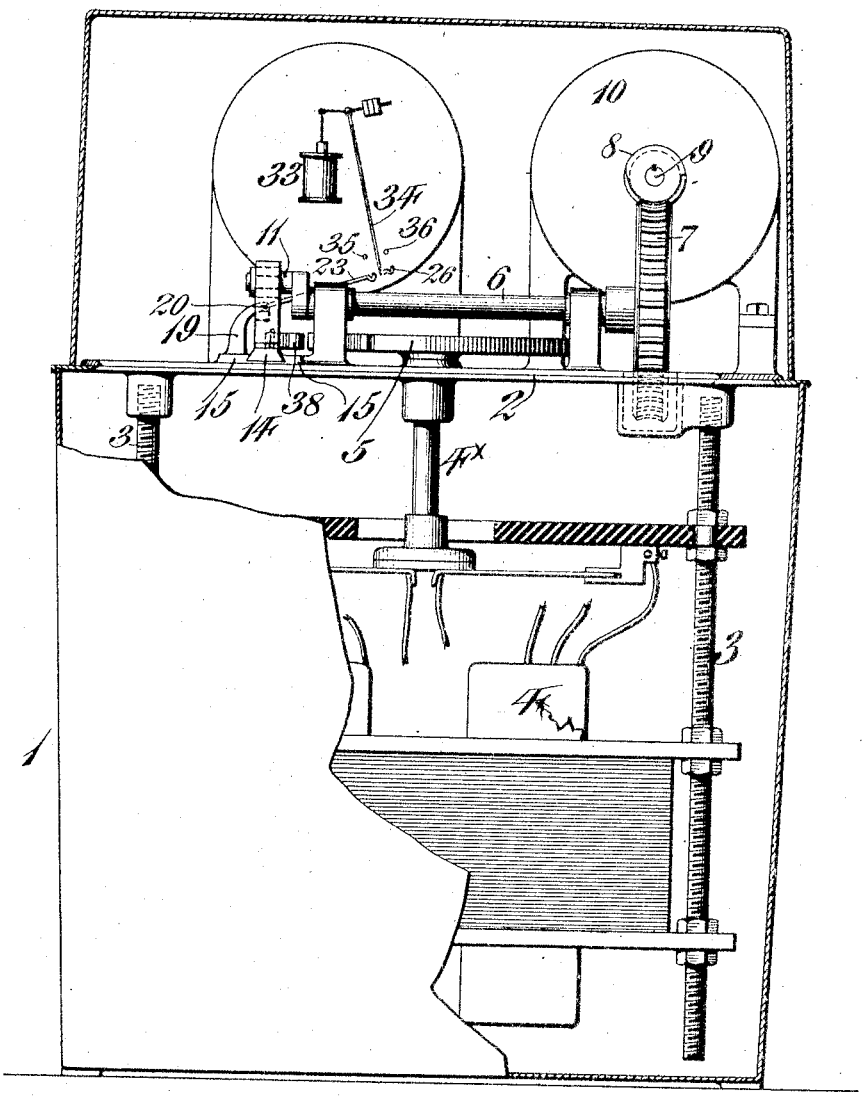

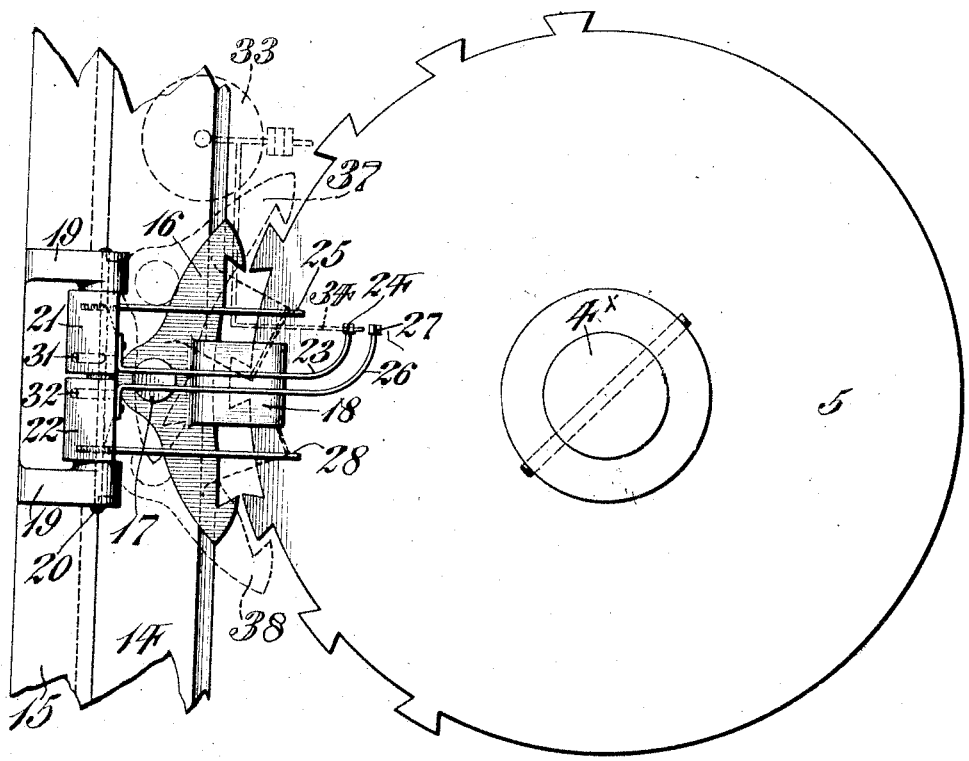
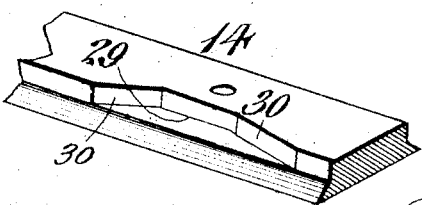

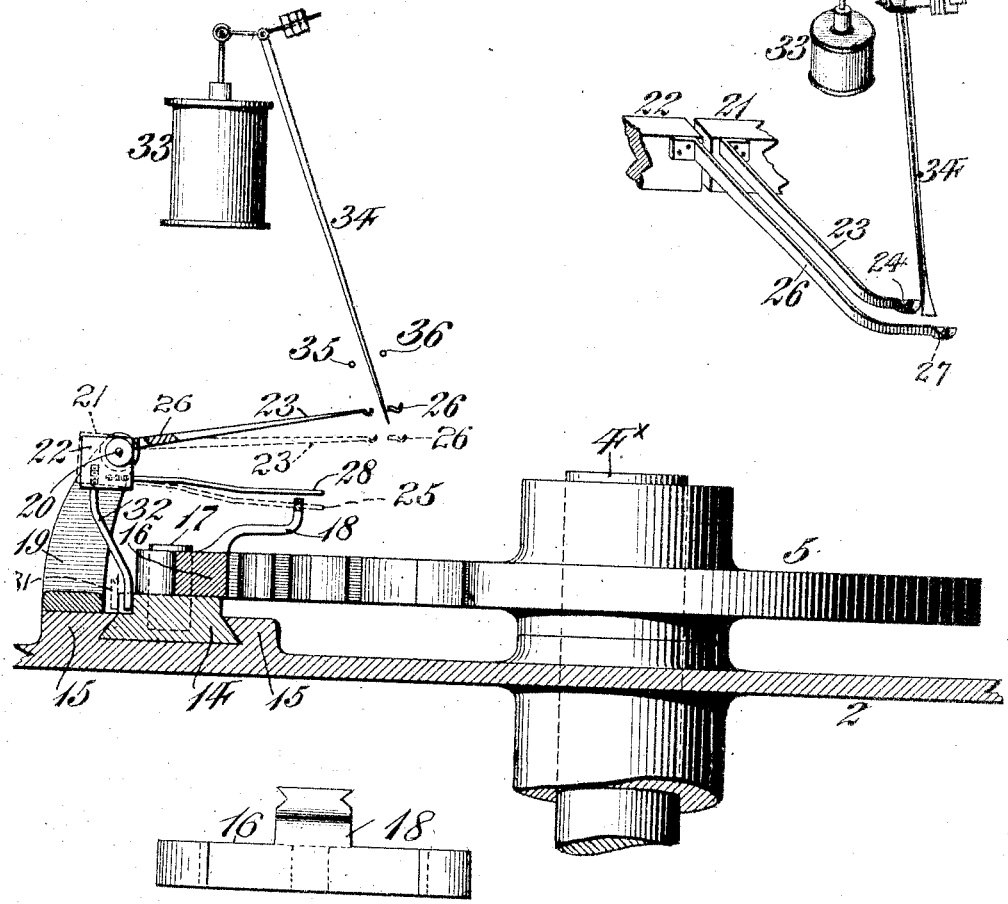

UNITED STATES PATENT OFFICE.

BENJAMIN PARKS RUCKER, OF CHARLOTTE, NORTH CAROLINA.

AUTOMATIC FEEDER-REGULATOR.

980,129.

Specification of Letters Patent. Patented Dec. 27, 1910.

Application filed April 1, 1910. Serial No. 552,845.

*To all whom it may concern:*

Be it known that I, BENJAMIN PARKS RUCKER, a citizen of the United States, residing at Charlotte, county of Mecklenburg, State of North Carolina, have invented a new and useful Automatic Feeder-Regulator, of which the following is a specification.

My invention relates to a new and useful automatic feeder regulator for regulating the voltage of an alternating current circuit and can be used with equal facility on single or polyphase circuits and has for its object to actuate a regulating transformer where the voltage has fallen or risen above the desired point.

It further consists of a volt meter device having an indicating needle which stands in one position when the current is normal and is moved from its position in one direction or the other, depending upon whether the voltage rises or falls from the normal and in providing arms which are reciprocated and which normally do not engage with the indicating needle, one or the other of which will engage therewith when the needle is moved in one direction or the other to suitably actuate the mechanism for actuating the transformer to return the voltage to its normal. I am aware that there are several types of automatic feeder regulators on the market but as far as I am aware they are all controlled by a series of contact making relays. These relays are very delicate and sensitive or will not respond properly to small changes in voltage, the contacts being very light are constantly giving trouble by not making good electric connections or by sticking or burning, thus making their operation unreliable or causing pumping in the circuit.

My invention is designed to overcome these defects and in the drawings, I have shown an embodiment of my invention which I have found operates successfully in practice, but it will be evident that changes may be made in the construction, the arrangement of the parts may be varied and other instrumentalities may be employed which will come within the scope of my invention and I do not therefore desire to be limited in every instance to the exact form as herein shown and described but desire to make such changes as may be necessary.

In the drawings I have shown a form of volt meter which can be of any suitable or known form and I have also shown a diagrammatic view of step type transformer mechanism which is actuated to return the voltage to its normal, but any form of transformer may be employed which will accomplish the desired result.

Figure 1 represents a plan view of an automatic feeder regulator embodying my invention with the cover removed. Fig. 2 represents a partial elevation and partial sectional view with a portion of the lower casing broken away. Figs. 3, 4, 5 and 6 represent views on an enlarged scale showing the different positions of the crank arm which operates the slide. Fig. 7 represents, on an enlarged scale, a plan view of some of the parts seen in Fig. 1. Fig. 8 represents a perspective view of a portion of the slide or guide bar showing the recesses therein. Fig. 9 represents a partial sectional view and partial elevation, on an enlarged scale, of the mechanism shown in the upper part of Fig. 2. Fig. 10 represents a perspective view of a portion of the device in detached position showing the position of the reciprocating arms and the indicating needle. Fig. 11 represents an elevation of pawl showing certain parts of the actuating mechanism.

Similar numerals of reference indicate corresponding parts in the figures.

Referring to the drawings. 1 designates a casing or tank carrying the frame or support 2 for the operating parts of the mechanism. In said casing 1, I mount a frame or other suitable structure 3 adapted to carry or support a transformer 4 which may be of any suitable form but which I have shown as a diagrammatic view of a step type transformer the moving contacts thereof being carried by a shaft $4^\times$ which is suitably journaled in the support 2 and is provided upon its upper portion with a toothed wheel or segment 5.

6 designates a shaft which is mounted in suitable journals and which is adapted to be actuated in any suitable manner. In the present instance, I have shown a gear 7 on said shaft meshing with a worm 8 which is carried on a shaft 9 of a motor 10 which is suitably carried by a support 2 but it will be understood that motion may be imparted to the shaft 6 in any suitable or desired manner.

11 designates a crank arm on said shaft which is in suitable engagement with the walls of a slot 12 in the plate or projection 13 which is connected with or carried by a guide bar or slide 14 which is guided for reciprocating movement on the support 2 and moves backwardly and forwardly, in the present instance, in the dove-tailed guides 15 on said support by which it will be understood that as the shaft 6 is rotated the crank arm 11 moves the slide backwardly and forwardly a required distance. Swingingly mounted on the slide 14 is a double ended pawl 16, said pawl, in the present instance, being mounted on the pin 17 carried by the slide 14 and the teeth of said pawl being oppositely facing with respect to each other.

18 designates an extension or projection on said pawl 16 which is preferably bent upwardly as best understood from Fig. 9, said extension being provided with seats or recesses upon opposite sides adjacent its upper portion as more clearly shown in Fig. 11. It will be understood that the pawl 16 and with it the extension 18 moves backwardly and forwardly with the slide 14.

19 designates ears stationarily supported, in the present instance, said ears being connected with or carried by the guides 15 for said slide. Carried by said ears 19 is a shaft or pin 20 on which are eccentrically mounted the weights 21 and 22, said weight 21 carrying the arm 23 provided with a seat or recess 24. Also carried by the weight 21 is a rod 25 which is preferably in a different horizontal plane from the arm 23. The weight 22 is provided with an arm 26 which extends adjacent the arm 23 leaving a space between the ends thereof and is also provided with a seat 27 adjacent its end. The weight 22 is also provided with a rod 28 which, as will be understood from Fig. 9 is in a different horizontal plane from the arm 26 it being noted that by reason of the mounting of the weights 21 and 22 off center or eccentrically that the same tends to elevate and hold in elevated position the arms 23 and 26 and the rods 25 and 28. At a suitable point in the slide or guide bar 14, I preferably provide a recess or cut away portion 29 having inclined sides 30 serving as contact faces to engage pins 31 and 32, the former being secured to the weight 21 and the latter secured to the weight 22. It will of course be understood that only one pin is engaged by a contact face at a time, according to the direction of movement of the slide 14. The engagement of the respective contact faces effects a movement of the arms 23 and 26, as well as the rods 25 and 28 and it will be understood that, in normal position, the rods 25 and 28 are removed from the path of movement of the extension 18, so that the pawl 16 under normal condition, reciprocates with the slide 14 without contacting or engaging with the teeth of the wheel or segment 5.

33 designates a volt-meter device of any suitable form or construction which is provided with a hand or indicating needle 34 which is positioned, when in normal position, to stand with the end thereof between the ends of the reciprocating arms 23 and 26 and is thus out of engagement therewith and permits the free movement of the arms 23 and 26.

35 and 36 designate stops at suitable points adjacent the needle 34 and against which the needle falls should there be a fluctuation of the voltage from the normal.

The operation of the device is as follows:—
The motor 10 having been started the shaft 6 is rotated imparting movement to the crank arm 11 which reciprocates the slide 14 backward and forward. This as previously stated in its movement carries with it the pawl 16 which in its normal position cannot engage with the teeth of the wheel 5. The reciprocation of the slide 14 actuates the weights 21 and 22 and reciprocates the arms 23 and 26 but as long as the voltage is approximately normal, the indicating needle 34 will remain in such position between the ends of the arms 23 and 26 so that no action on the part of the regulator takes place. Should, however, the voltage fluctuate for any reason and, for example fall, the indicating needle 34 will move to a position against the stop 35 and will be in the line of movement of the arm 23 and the same on rising will cause the end of the indicating needle 34 to be engaged by the seat or recess 24 on said arm. This will hold down the arm 23, weight 21 and rod 25 in the position seen in dotted lines, Fig. 9, causing the rod 25 to be in the line or path of movement of the extension 18 so that the rod will engage with the seat or recess in said extension and will act as a stop to said extension and to said pawl. As, however, the slide continues its movement the pawl will be rotated in the position seen in dotted lines at 37 in Fig. 7 and one of the teeth of the pawl will thus be moved to a position to engage with one of the teeth of the wheel 5 so that as the reciprocation of the slide continues the wheel 5 is rotated changing the position of the transformer contact and cutting in coils thus increasing the voltage as required. This process is continued until the voltage has reached normal value or the limit of the transformer has been reached. The indicating needle 34 will return to its normal position again by return of the voltage to its normal. Should the voltage increase the indicating needle 34 is moved in an opposite direction contacting with the stop 35 and placing the end thereof in position to be engaged by the seat 27 of the arm 26 which will prevent the rod 28 from rising and thereby cause the same to engage with the projection 18 and act as a stop thereto. As the slide moves the pawl 16 will be moved in the position seen in dotted lines at 38, Fig. 7, into position to engage with one of the teeth of the wheel 5 and as the reciprocation of the slide 14 continues the wheel 5 will be rotated in an opposite direction from that previously described thus cutting out coils of the transformer and so decreasing the voltage as required. This operation will be repeated until the proper time. In this way it will be understood that I have provided by mechanical means a regulator which is positive in its action and eliminates all delicate or sensitive electrical contacts or other parts liable to get out of order or give trouble in service. By the reciprocation of the arms 23 and 26 and by the movement of the point of the indicating needle 34 it will be seen that this device operates on the hit or miss principle and while I have shown one form or embodiment, as previously stated, various changes could be made which would operate successfully.

Having thus described my invention, what I claim as new and desire to secure by Letters Patent, is:—

1. In a device of the character stated, a regulating transformer, a movable member therefor, a volt meter device having an indicating needle, arms pivotally mounted and adapted to be reciprocated normally out of the path of said needle and one of said arms adapted to engage with said needle when the voltage falls below the normal and the other adapted to engage with the needle when the voltage rises above the normal, and connections between said reciprocating arms and said transformer adapted to actuate said movable member for regulating the voltage of the circuit when one or the other of said arms engages with said needle.

2. In a device of the character stated, a regulating transformer, a movable member therefor, a volt meter device having an indicating needle, arms adapted to be reciprocated and normally out of the path of said needle when the voltage is at a normal potential, one of said arms being adapted to engage with said needle when the voltage falls and the other to engage with the needle when the voltage rises, and a pawl adjacent said arms adapted to be actuated to actuate the movable member in one direction or the other to return the voltage to its normal potential.

3. In a device of the character stated, a regulating transformer, a movable member therefor, a volt meter device having an indicating needle, arms adapted to be reciprocated and normally out of the path of said needle when the voltage is at a normal potential, one of said arms being adapted to engage with said needle when the voltage falls and the other to engage with the needle when the voltage rises, and means thrown into operation by one or the other of said arms to actuate the movable member in one direction or the other to return the voltage to its normal potential.

4. In a device of the character stated, a regulating transformer, a movable member therefor, a volt meter device having an indicating needle, arms adapted to be reciprocated and normally out of the path of said needle when the voltage is at a normal potential, one of said arms being adapted to engage with the needle when the voltage fluctuates whereby one or the other of said arms is held in lowered position, a rod controlled by each of said arms and held in lowered position therewith, and means adapted to be engaged by one or the other of said rods and thrown into operation to actuate the movable member in one direction or the other to return the voltage to its normal potential.

5. In a device of the character stated, a regulating transformer, a movable member therefor, a volt meter device having an indicating needle, arms adapted to be reciprocated and normally out of the path of said needle when the voltage is at a normal potential, one or the other of said arms being adapted to engage with said needle when the voltage fluctuates, a rod controlled by each of said arms, a pawl adapted to be thrown into operation by one or the other of said rods, and means for reciprocating said pawl whereby the same will actuate the movable member in one direction or the other to return the voltage to its normal potential.

6. In a device of the character stated, a regulating transformer, a movable member therefor, a volt meter device having an indicating needle, arms adapted to be reciprocated and normally out of the path of said needle when the voltage is in normal potential, a pawl adapted to be thrown into operative position when one or the other of said arms engages with said needle, whereby said transformer member is actuated, means for reciprocating said pawl, and means for reciprocating said arms by the movement of said pawl reciprocating means.

7. In a device of the character stated, a regulating transformer, a movable member therefor, a volt meter device having an indicating needle, arms adapted to be reciprocated and normally out of the path of said needle when the voltage is at a normal potential, one of said arms being adapted to engage with said needle when the voltage falls and the other to engage with the needle when the voltage rises, reciprocating means adapted to actuate said arms to move the same, a pawl carried by said reciprocating means, and means for throwing said pawl into operation by one or the other of said arms in order to actuate the movable member in one direction or the other to return the voltage to its normal potential.

8. In a device of the character stated, a regulating transformer, a movable member therefor, a volt meter having an indicating needle, arms adapted to be reciprocated normally out of the path of said needle when the voltage is at its normal potential, one of said arms being adapted to engage with said needle when the voltage falls and the other to engage with the needle when the voltage rises, rods controlled by said arms, a slide adapted to be reciprocated, means actuated by said slide for reciprocating said arms, a pawl carried by said slide, means for actuating said pawl to vary the position thereof when one or the other of said arms is in engagement with said needle, and means actuated by said pawl for actuating the movable member in one direction or the other to return the voltage to its normal potential.

9. In a device of the character stated, a regulating transformer, a movable member therefor, a volt meter device having an indicating needle, a slide, means for moving the same backward and forward, a pawl carried by said slide and having an extension thereon, weights eccentrically supported, means between said weight and said slide for rocking the same, arms carried by said weights and reciprocating therewith normally out of the path of said needle when the voltage is at a normal potential, one of said arms being adapted to engage with said needle when the voltage falls and the other to engage with the needle when the voltage rises, and means controlled by the said arms and adapted to engage with said extension for moving the pawl in one direction or the other to actuate the movable member to return the voltage to its normal potential.

10. In a device of the character stated, a regulating transformer, a movable member therefor, a volt meter device having an indicating needle, a slide, means for reciprocating said slide, weights eccentrically supported, rods depending from said weights and engaging with the walls of the recesses in said slide whereby said weights are rocked, an arm carried by each of said weights and reciprocating therewith, the ends of said arms being normally out of the path of said needle and one of said arms being adapted to engage with said needle when the voltage falls and the other to engage with the needle when the voltage rises, a rod carried by each of said weights, a pawl movably supported by said slide, an extension on said pawl normally out of the path of said rods and adapted to engage with one or the other thereof when one or the other of said arms is in engagement with said needle, whereby said pawl is moved to a proper position, and means engaged by said pawl and rotated thereby for actuating the movable member to return the voltage to its normal potential.

BENJAMIN PARKS RUCKER.

Witnesses:
MAY B. MILLER,
J. E. DAVIS.